United States Patent [19]

Yamato et al.

[11] 4,250,798
[45] Feb. 17, 1981

[54] METHOD OF AND DEVICE FOR FABRICATING PLASTIC SLEEVES

[75] Inventors: Yoshihiro Yamato; Hideo Okada; Masayuki Takasaka, all of Yokohama; Masanori Urabe, Tokyo, all of Japan

[73] Assignee: Toyo Garasu Kabushiki Kaisha, Tokyo, Japan

[21] Appl. No.: 959,775

[22] Filed: Nov. 13, 1978

[30] Foreign Application Priority Data

Dec. 19, 1977 [JP] Japan ............................ 52-152600

[51] Int. Cl.³ ................................................ B31C 1/02
[52] U.S. Cl. ...................................... 493/306; 53/585; 53/296; 156/456
[58] Field of Search ................. 53/399, 456, 487, 575, 53/585, 291, 292, 296; 93/81 MT, 44.1 R; 156/189, 194, 86, 218, 446, 457, 456

[56] References Cited

U.S. PATENT DOCUMENTS

| 2,660,355 | 11/1953 | Gampp | 53/292 |
| 2,843,986 | 7/1958 | Carter | 53/291 |
| 3,049,979 | 8/1962 | Sayford, Jr. | 93/81 MT |
| 3,728,196 | 4/1973 | Rausing | 156/447 X |
| 3,802,942 | 4/1974 | Amberg et al. | 156/456 X |

*Primary Examiner*—John Sipos
*Attorney, Agent, or Firm*—Wenderoth, Lind & Ponack

[57] ABSTRACT

A plastic sleeve is fabricated by: winding a blank of plastic film around a hollow cylindrical mandrel having a groove of arcuate cross section extending in the mandrel axial direction along the mandrel outer surface and having numerous through holes through its wall including the concave surface of the groove, the blank ends being overlapped; applying a vacuum through the holes to the inner surface of the blank thereby to draw it by suction tightly against the mandrel outer surface; heat sealing the overlapped ends of the blank thereby to form a sleeve; and vitiating the vacuum and applying pressure above atmospheric to the inner surface of the sleeve thereby to facilitate the succeeding step of stripping the sleeve from the mandrel and fitting it on a glass bottle.

3 Claims, 4 Drawing Figures

FIG. I

METHOD OF AND DEVICE FOR FABRICATING PLASTIC SLEEVES

BACKGROUND OF THE INVENTION

This invention relates generally to methods and apparatuses for fabricating plastic sleeves and more particularly to a method and device in which a blank of plastic film is wound around the cylindrical outer surface of each of a plurality of cylindrical mandrels of a unique design of a turret assembly, the ends of the blank being overlapped. The overlapped ends are heat sealed thereby to form a plastic sleeve, and this sleeve is easily slipped of the mandrel and onto a glass bottle.

Recently, there has appeared the practice of fitting a sleeve of a plastic film with a decorative pattern applied beforehand thereon onto the outer surface of a glass bottle and placing this glass bottle thus covered with the sleeve in a heating oven thereby to cause the film to undergo heat shrinkage and thereby to adhere tightly to the surface of the glass bottle. In the fabrication of the above described sleeve of plastic film, a blank of the plastic film is wound around the cylindrical outer surface of a cylindrical mandrel, the length of the blank being sufficient to cause its ends to be overlapped when the blank is thus wound, and the end edge parts thus overlapped are heat sealed. The sleeve of the plastic film thus formed is stripped or caused to slide off the mandrel for removal therefrom and is then fitted onto a glass bottle and caused to adhere tightly thereto by the above mentioned heat shrinkage process step.

However, in the step of removing the plastic film sleeve from a conventional mandrel and fitting the sleeve onto a glass bottle, there have heretofore been frequency cases wherein the plastic sleeve cannot be easily removed from the mandrel. This difficulty in the removal of the plastic sleeve is caused by the tight adhesion of the sleeve to the mandrel due to heat shrinkage of the sleeve caused by the heat sealing of its the seam at the overlapped ends.

SUMMARY OF THE INVENTION

It is an object of this invention to provide a method of fabricating plastic sleeves in which each plastic sleeve formed by heat sealing the overlapped ends of a plastic film blank wound around a mandrel is easily removed from the mandrel for fitting onto a glass bottle.

Another object of the invention is to provide a device for fabricating sleeves which includes at least one mandrel on which a plastic sleeve is formed by heat sealing the overlapped ends of a plastic film blank wound around the mandrel, and from each of which the plastic sleeve thus formed can be easily removed for fitting onto a glass bottle.

According to this invention in one aspect thereof, briefly summarized, there is provided a method of fabricating plastic sleeves which comprises: cutting a long web of plastic film into blanks of specific length; winding each blank around the cylindrical outer surface of a respective mandrel having a hollow cylindrical shape having at least one groove formed in the cylindrical outer surface thereof along an element thereof, said specific length being such that the ends of the blank thus wound mutually overlap to form an overlap; applying a vacuum to the inner surface of the blank thus wound thereby to draw the bank tightly against the mandrel; pressing a welder seam bar against said overlap thereby to heat seal the same to form a seam and thereby to form a plastic sleeve; vitiating the vacuum and, if necessary, applying a pressure higher than atmospheric to the inner surface of the sleeve; and stripping the sleeve off the mandrel and fitting the sleeve onto an article.

According to this invention in another aspect thereof, briefly summarized, there is provided a device for fabricating plastic sleeves comprising: at least one mandrel comprising a mandrel body having a hollow cylindrical shape having at least one groove formed in the cylindrical outer surface thereof along an element thereof and a plurality of holes through the cylindrical wall of the mandrel body to provide free communication between the hollow interior of the mandrel body and the cylindrical outer surface thereof, inclusive of the depressed surface of the groove, the mandrel being adapted to hold around the cylindrical outer surface thereof a blank of a plastic film in a substantially cylindrical shape with overlapped ends; means for applying a vacuum to said hollow interior thereby to draw said blank tightly against said outer surface; sealing means for bonding together said overlapped ends thereby to form a seam therealong and thereby to form a plastic sleeve; and stripping means for stripping the plastic sleeve thus formed off the mandrel and fitting the sleeve onto an article.

The nature, utility, and further features of this invention will be more clearly apparent from the following detailed described when read in conjunction with the accompanying drawings, in which like parts are designated by like reference numerals, and which are briefly described below.

DETAILED DESCRIPTION

Figure 1:
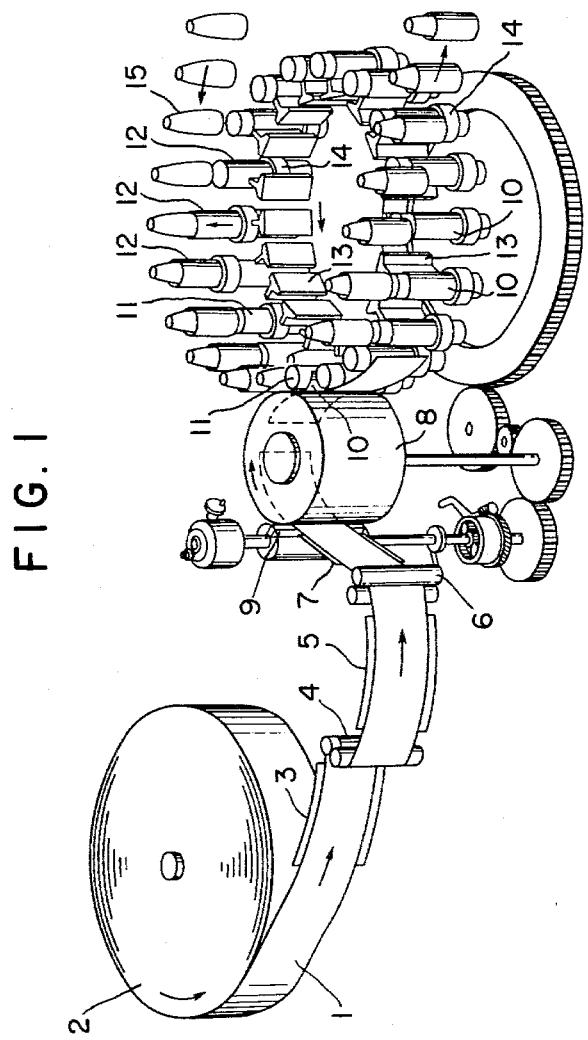
FIG. 1 is a perspective view showing the essential parts of an apparatus for fabricating plastic sleeves and fitting the same on respective glass bottles, in which apparatus the device for fabricating plastic sleeves according to this invention is incorporated.

Referring to FIG. 1, the plastic film for forming the plastic sleeves is in the form of a web stock material 1 fed from a web roll 2. This web stock material 1, upon being paid out from the web roll 2, is guided successively by a first web guide 3, an S-guide 4, and a second web guide 5 and is supplied to feed rolls 6. The web stock material 1 thereby drawn out by the feed rolls 6 is guided by a third web guide 7 and thus fed to the cylindrical surface of a transfer drum 8 having a vacuum suction action. The web stock material 1 is fed further while being momentarily adhered to the cylindrical surface of the transfer drum 8 due to the vacuum suction action of the drum, and, at an intermediate point, one section of the leading portion of the web 1 having a specific length is cut off by a revolving knife 9 and thus formed into a blank 10. This revolving knife 9, of course, is adapted to revolve synchronously with the rotation of the transfer drum 8.

Then, at a point in the vicinity of one of a plurality of vertical mandrels 11 disposed on a common circle on and around a turret, the leading end of the blank 10 is transferred onto this mandrel 11 by a blast of air ejected from the transfer drum 8. This blank 10 is then subjected to a vacuum suction action and adheres to the cylindrical surface of the rotating mandrel 11. Then, as the mandrel 11 rotates, the blank 10 is wound into a hollow cylindrical shape around the cylindrical surface of the mandrel and is thus formed into a sleeve 12.

At this time, the trailing end of the blank 10 is overlapped over the leading end thereof, whereby an overlap is formed. The rotation of the mandrel 11 about its own axis is stopped at an angular position of the mandrel where this overlap of the sleeve 12 is facing inward directly toward the rotational axis of the turret. Thereafter, the mandrel 11 moves along a circular path in accordance with the rotation of the turret. Then, when the mandrel 11 arrives at a specific station, a welder seam bar 13 is pressed against the above described overlap of the sleeve 12 disposed around the mandrel 11. Then, after the welder seam bar 13 has been drawn back, the vacuum suction action of the mandrel 11 is terminated.

The turret continues to rotate until the weld seam bar retracts, and the plastic sleeve 12 is forced fit around a glass bottle 15 by a stripper ring 14 as the mandrel 11 rotates. The glass bottle 15 thus enveloped by the plastic sleeve 12 is then conveyed into a heating over and heated, whereupon the plastic sleeve 12 undergoes heat shrinkage, thereby adhering closely and tightly to the outer surface of the glass bottle 15.

The construction and operation of an example of the mandrel 11 constituting an essential feature of this invention will now be described with reference to FIGS. 2 through 4.

Figure 2:
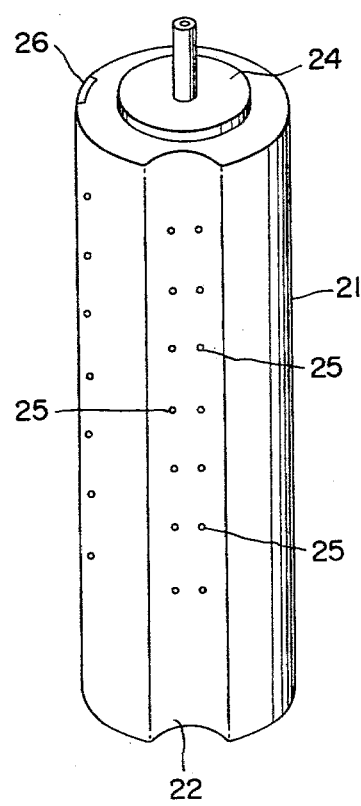
FIG. 2 is a perspective view of a mandrel constituting an essential part of the device for fabricating plastic sleeves according to the invention.

Referring first to FIG. 2, the mandrel shown therein has a mandrel body 21 having a hollow cylindrical shape having a flute or groove 22 extending along the outer cylindrical surface thereof parallel to the cylindrical axis of the body 21. This groove 22 has a concave arcuate profile as viewed in a cross section of the mandrel body 21, and the two points at which the concave surface of this groove 22 and the cylindrical outer surface of the mandrel body 21 are rounded.

The mandrel body 21 has an interior chamber 23 which is closed at the lower end thereof as viewed in FIG. 2. An adapter 24 is mounted on the upper end of the mandrel body 21 and is connected by way of a pipe to vacuum source and a compressed air source (both not shown).

On one hand, a plurality of holes 25 extend through the wall of the mandrel body 21 and open out of the surface of the groove 22 and constitute communicating passages from the interior chamber 23 to the groove 22. Accordingly, when the interior chamber 23 is connected by way of the adapter 24 and the pipe to the vacuum source, a plastic blank 10 wound around the mandrel is drawn closely against the outer surface of the mandrel. On the other hand, when the chamber 23 is connected to the compressed air source, the plastic sleeve 12 formed from the blank 10 on the mandrel is inflated. While in the example illustrated in the drawing, these holes 25 are shown as being circular holes, they may be in the form of slits.

In addition, a heat-seal strip 26 is embedded in the outer cylindrical surface of the mandrel body 21 at a position to one side of the groove 22. This heat-seal strip 26 is made of a thermally insulating material, preferably a teflon resin. A plurality of holes 27 extend through the wall of the mandrel body 21 in two rows on opposite sides of the heat-seal strip 36.

The operation of each mandrel 11 of the above described construction will now be described with reference to FIGS. 3 and 4.

Figure 3:
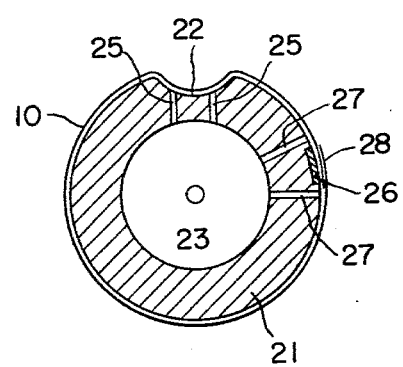
FIG. 3 is a cross sectional view illustrating the relationship between the mandrel and a blank of plastic film at the time of heat sealing, when a vacuum is being applied to the inner surface of the blank.
Figure 4:
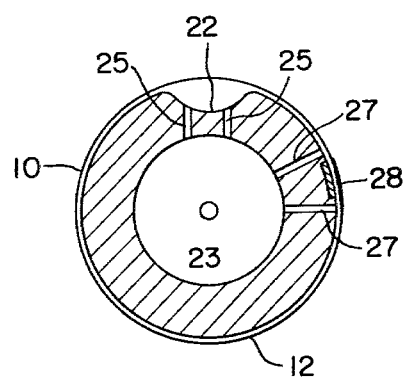
FIG. 4 is a cross sectional view illustrating the relationship between the mandrel and the blank, which has now been fabricated into a sleeve, after the heat sealing step.

As described hereinbefore, a blank 10 of a plastic film is cut off the web 1 by the knife 9, transferred by the transfer drum 8 to a corresponding mandrel 11, and wound around the cylindrical outer surface of the mandrel body 21 as shown in FIG. 3. In this state of the blank 10, the trailing edge part is overlapped over the leading edge part to form an overlap 28 as described hereinbefore.

In accordance with this invention, the interior chamber 23 is then connected to the vacuum source with the blank 10 in this state, whereby the holes 25 and 27 are placed in communication with the vacuum source. Consequently, the blank 10 is drawn tightly against the outer surface of the mandrel body 21. The part of the blank 10 above the groove 22 of the mandrel body 21, particularly, is caused to adhere tightly against the concave surface of the groove 22. The overlap 28 of the blank 10 is positioned directly above and against the heat-seal strip 26. With the blank 10 in this position on the mandrel 11, the welder seam bar 13 is pressed against the overlap 28 to heat seal the overlap 28 and form the desired seam, whereupon the step of forming the plastic sleeve 12 is completed.

Then the interior chamber 23 of the mandrel is disconnected from the vacuum source and connected to the compressed air source. As a consequence, the pressure within the chamber 23 of the mandrel is changed from a negative value to a value exceeding the atmospheric pressure, and air is forced out through the through holes 25 and 27. The plastic sleeve 12 around the mandrel body 21 is thereby inflated as shown in FIG. 4, and the inner diameter thereof becomes somewhat greater than the outer diameter of the mandrel body 21, whereby a small gap is formed between the sleeve and mandrel body. As a result, it becomes possible to remove the plastic sleeve 12 from the mandrel 12 easily.

While in the above described embodiment of this invention, compressed air is supplied into the interior chamber 23 of the mandrel after the heat sealing step, this supplying of compressed air is not absolutely necessary, it being sufficient in most cases to merely open the chamber 23 to the atmosphere thereby to vitiate or break the vacuum therein. Furthermore, in the above described example, the mandrel body 21 is provided with only one flute or groove 22, but two or more similar grooves may be provided.

From the foregoing disclosure, it will be seen that, because of the provision of at least one groove along the cylindrical outer suface of the mandrel body having an interior chamber which can be connected to a vacuum source, the part of a blank of plastic film above the groove at the time of heat sealing is caused to adhere tightly to the concave surface of this groove and then, after the heat-sealing step, is released from this tightly adhering state, whereby the plastic sleeve thus formed acquires a circumferential dimension which is greater than the circumference of the mandrel body and, therefore, can be easily slipped off the mandrel body.

We claim:

1. A device for fabricating plastic sleeves, comprising:

a mandrel body having a hollow interior and a cylindrical outer surface with at least one groove having a concave surface extending therealong parallel to the cylindrical axis of said mandrel body for supporting a cylindrical shape with the ends overlapped, said concave surface having a profile which is longer in the peripheral direction of said mandrel body than the length of the profile of said cylindrical surface extended across said groove, said mandrel body having a plurality of holes extending therethrough and opening in said groove and on said outer surface;

means for successively applying vacuum and pressurized gas to said hollow interior to successively draw said blank tightly against said outer surface and the surface of said groove by suction through said holes and expand said blank to a diameter greater than that of the outer surface of the mandrel body;

sealing means movable into engagement with said overlapped ends against said mandrel body for bonding together said overlapped ends to form a seam therealong and thereby form a plastic sleeve; and stripping means movable along the cylindrical surface of said mandrel body parallel to the axis of said mandrel body for stripping the plastic sleeve thus formed off said mandrel body when the applying means ceases to apply vacuum and applies compressed gas to said holes, whereby the sleeve expands freely due to the difference in lengths of said profiles out of contact with said mandrel to a diameter sufficiently greater than the diameter of said mandrel body to be easily and surely stripped from said mandrel body by said stripping means.

2. A device for fabricating plastic sleeves as claimed in claim 1 in which said at least one groove of the mandrel body is a straight groove having an arcuate cross section taken in a plane perpendicular to the cylindrical axis of the cylindrical mandrel body.

3. A device for fabricating plastic sleeves as claimed in claims 1 and 2 in which the mandrel body has embedded along the outer cylindrical surface parallel to the cylindrical axis thereof a heat-seal strip made of a thermally insulating material, said strip being circumferentially spaced from said groove, and said sealing means comprises a welder seam bar which is movable for, at the time of bonding, being pressed against said overlapped ends to press said overlapped ends against said heat-seal strip to thereby heat seal the overlapped ends.

* * * * *